Feb. 25, 1958  C. T. WALLIS  2,824,331
WINDSHIELD WIPER BLADE ASSEMBLY
Filed May 10, 1954
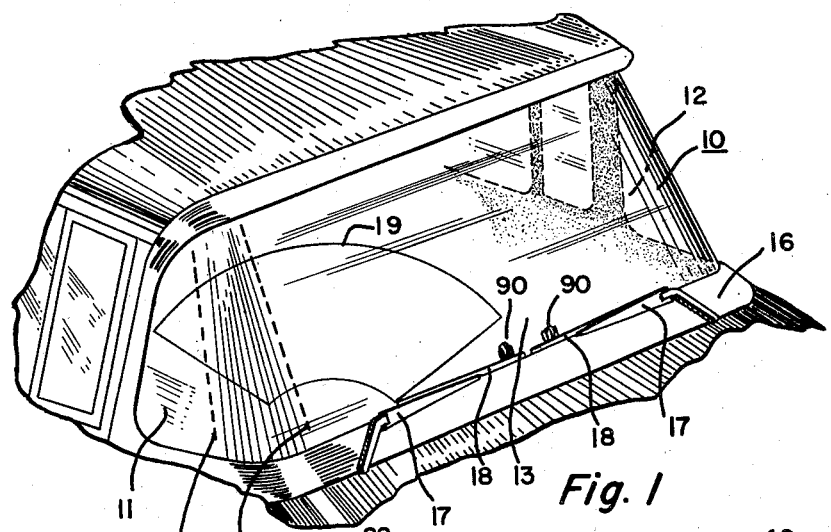
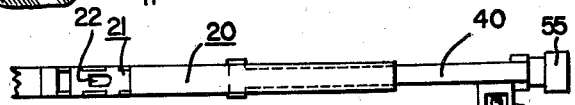
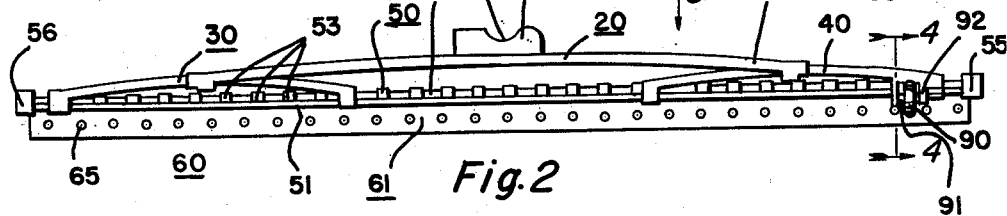
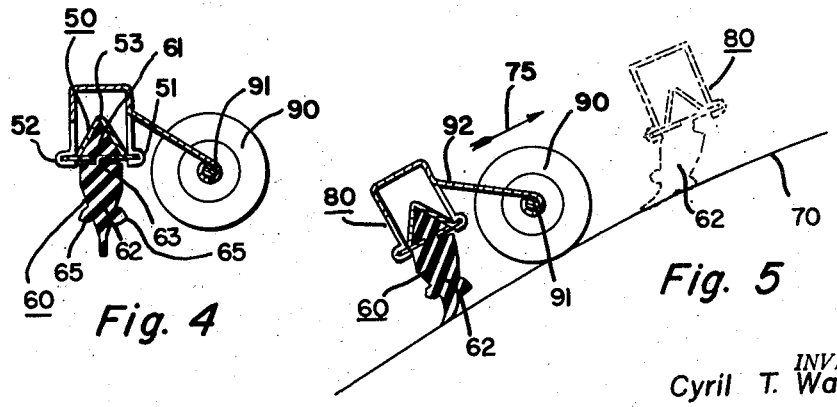
INVENTOR.
Cyril T. Wallis
BY
George H. Strickland
His Attorney United States Patent Office 2,824,331
Patented Feb. 25, 1958

2,824,331
WINDSHIELD WIPER BLADE ASSEMBLY

Cyril T. Wallis, Brockport, N. Y., assignor to General Motors Corporation, Detroit, Mich., a corporation of Delaware Application May 10, 1954, Serial No. 428,563

6 Claims. (Cl. 15—245)

This invention pertains to window cleaners, and particularly to a wiper device adapted to clean a curved surface as well as a substantially planar surface.

Heretofore, windshield wiper blades have been designed for cleaning curved surfaces, one type of blade being disclosed in the Anderson Patent 2,596,063. However, this type of blade was not designed, and does not properly clean, a sharply curved window surface, commonly known as a wrap-around windshield. In this type of windshield the end sections are disposed in spaced, substantially parallel, vertical planes on opposite sides of a vehicle, and the window extends throughout an arcuate distance of substantially 180°. With present day wiper blades, it is difficult, if not impossible, to properly clean substantial portions of the sharply curved end sections due to the fact that the wiping element, or squeegee, tilts or "crowds" the windshield surface to such an extent that present day wiper motors cannot effect uniform blade movement. However, I have discovered that present day wiper blade assemblies can be easily modified so as to properly clean the surface of a wrap-around windshield throughout an arc of substantially 120°, or greater, from the cowl or "rail" of the vehicle. Accordingly, among my objects are the provision of means attachable to a wiper blade assembly of the type now in use for rendering it effective to properly clean wrap-around windshields; the further provision of a window cleaner including means for limiting the tilt of the wiping element; and the still further provision of means for preventing undesirable crowding of a wiping element against a surface to be cleaned, and particularly to provide means for preventing crowding of present day wiping elements against sharply curved portions of a wrap-around windshield.

The aforementioned and other objects are accomplished in the present invention by attaching a roller, or a plurality of rollers, adjacent the outer end of a present day wiper blade assembly so as to limit tilting of the wiping element and prevent crowding thereof. Specifically, the wiper blade to which the roller is attached is of the type including a flexible rubber, rubber-like, or elastomeric, wiping element which conforms to the surface curvature; a primary yoke having an arm attaching part; a pair of secondary yokes pivotally connected intermediate their ends to the ends of the primary yoke; and a flexible backing strip which carries the wiping element, the ends of the secondary yokes being connected to the backing strips at longitudinally spaced portions thereof. The end of the secondary yoke which is attached to the outer end of the flexible backing strip has attached thereto a bracket having a bifurcated end portion which carries a pin, or shaft, about which a roller is rotatably journaled.

The roller is adapted to engage the surface of the windshield as the wiper blade traverses the sharply curved portions thereof, and when the roller does engage the curved surface, the tilt of the wiping element will be automatically limited to substantially 10° relative to the surface being wiped. In this manner, crowding of the wiping element against the curved surface is prevented, thereby enabling the use of present day wiper blades for effectively cleaning wrap-around windshields. Alternatively, a plurality of rollers on the same blade side, or a pair of rollers disposed on opposite sides of the blade, or even a plurality of rollers disposed at opposite ends of the blade, may be used so as to limit tilting of the wiping element. Thus, it is to be understood that while only one roller is depicted in the drawing, this is only exemplary and is not to be construed as a limitation.

Further objects and advantages of the present invention will be apparent from the following description, reference being had to the accompanying drawing wherein a preferred embodiment of the present invention is clearly shown.

In the drawing:

Figure 1 is a fragmentary view, in perspective, illustrating a vehicle with a wrap-around windshield, and depicting the windshield area to be cleaned;

Figure 2 is a side view, in elevation, of a blade constructed according to the present invention;

Figure 3 is a fragmentary view, in elevation, taken in the direction of arrow 3 in Figure 2;

Figure 4 is an enlarged sectional view taken along line 4—4 of Figure 2; and

Figure 5 is a composite view illustrating operation of a conventional wiper blade on a sharply curved surface, with and without the means of this invention.

With particular reference to Fig. 1, a portion of a motor vehicle is depicted, the vehicle being of the type including a wrap-around windshield generally indicated by the numeral 10. It will be observed that the windshield is of the type which is being used on some of the present day automobiles, and, thus, includes end sections 11 and 12 which are disposed in spaced, substantially parallel, vertical planes on opposite sides of the vehicle. The end sections 11 and 12 are formed integral with a curved front portion 13, from which it may be seen that the windshield extends throughout an arcuate distance of substantially 180°. In a windshield of this character, the portion between dotted lines 14 and 15 is commonly referred to as the "hump" in that it has a very pronounced curvature.

In a conventional manner, the vehicle includes a cowl or rail portion 16 through which spaced, oscillatable wiper shafts, not shown, project. Each wiper shaft has attached thereto a wiper arm assembly 17 of conventional construction and, thus, it will be appreciated that the wiper arms 17 are capable of pivotal movement away from the surface of the windshield, and are spring biased against the surface of the windshield so as to apply wiping pressure to blade assemblies 18 which are operatively connected to the ends thereof.

With reference to Fig. 2, a conventional wiper blade assembly of the type now in use, is disclosed. The wiper blade assembly includes a primary yoke member, or bridge means 20 having means 21 designed to detachably connect the wiper blade assembly to the free end of the wiper arm, the means 21 having an opening 22 therein and a suitable locking device for holding the free end of the arm in the opening. The ends of the primary yoke 20 are pivotally connected to the intermediate portions of a pair of secondary yokes 30 and 40. Opposite ends of the secondary yoke 30 are pivotally connected to longitudinally spaced points of a flexible backing strip 50, which is constructed from an integral piece of metal and includes a pair of spaced, longitudinally extending flanges 51 and 52, as well as a plurality of spaced eyelets, or hooks, 53. Opposite ends of the secondary yoke 40 are likewise pivotally connected to longitudinally spaced points of the backing strip 50. In addition, the end of one of the secondary yokes is interlocked with the backing strip 50 so as to limit longitudinal movement of the backing strip 50 with respect to the yoke assemblies 20, 30 and 40.

The wiping element 60 is constructed of resilient elastomeric material, and includes a retaining portion 61, generally triangular in cross-section, and a wiping portion 62, which are integrally and pivotally joined together by a reduced neck portion 63. The wiping element 60 is constructed so that it may be interconnected with the flexible backing strip 50 by inserting one end of the triangular portion 61 thereof into one of the hooks 53 so that the flanges 51 and 52 of the backing strip are received in the grooves between the portions 61 and 62 thereof. Thereafter, the wiping element 60 may be slid longitudinally relative to the backing strip 50 until one end abuts a relatively hard, rubber-like abutment 55, which is interlocked with the outer end of the flexible backing strip 50. Thereafter, a second abutment member 56 is attached to the inner end of the flexible backing strip 50 so as to maintain the wiper element, or squeegee, in assembled relation with the blade assembly.

It will be appreciated that by reason of the construction of the wiper element 60, that is, by reason of the reduced neck portion 63 interconnecting portions 61 and 62 thereof, the wiping portion 62 is capable of substantial tilting or pivotal movement relative to the portion 61, which is retained by the flexible backing strip 50. The wiping portion 62 may also be formed with a plurality of longitudinally spaced hemispherical knobs 65 on opposite sides thereof, as shown in Figs. 2 and 4.

As previously alluded to, the conventional present day wiper blade assembly hereinbefore described, was designed to clean curved, as well as substantially planar surfaces. However, this type of wiper blade assembly was designed prior to the advent of the wrap-around windshield, and, in fact, a windshield of this type was not even contemplated by those who designed wiper blade assemblies now in use. Exhaustive studies have indicated that the only portion of a wrap-around windshield that can be properly cleaned with present day wiper blade assemblies, is that portion between the cowl, or rail, 16 of the windshield, as viewed in Fig. 1, and dotted line 15. It is readily apparent that this only includes an arcuate distance of substantially 90°. It will further be appreciated that one of the primary purposes of the wrap-around windshield is to eliminate what has been known as the "blind spot" caused by the corner posts in prior vehicles. However, if the portion between lines 14 and 15 of the windshield cannot be cleaned by the windshield wipers, the safety features which were contemplated by the inclusion of a wrap-around windshield will not be achieved.

My studies have shown that one of the principal reasons why the present day wiper blade assembly cannot be used to properly clean the sharply curved portion, or hump, of a wrap-around windshield, as depicted between dotted lines 14 and 15 in Fig. 1 resides in the fact that the wiping portion 62 of the resilient wiping element 60 tilts to an excessive amount. With particular reference to Fig. 5, the line 70 depicts the actual curvature of a windshield at the outer end of the blade, as indicated by line 19 in Fig. 1, on some of the present day motor vehicles. The arrow 75 in Fig. 5 indicates the direction of wiper blade movement, the phantom, or dotted line, blade assembly 80 being of the type hereinbefore described, while the cross-sectioned wiper blade assembly 80 is constructed according to the present invention. For an inspection of the phantom blade 80, it will be noted that the wiping portion 62 thereof has tilted an excessive amount, which I choose to describe as "crowding" the windshield. It has been observed that when the wiping portion 62 crowds the windshield in this manner, it overloads the wiper motor, does not move uniformly across the surface of the windshield, and, hence, does not properly clean the surface. I have also discovered that if some means are provided for limiting the angle of tilt of the wiping portion 62 to substantially 10° relative to the curved surface, as shown in the cross-sectioned blade 80 in Fig. 5, an arcuate distance of substantially 120° from the rail can be effectively and properly cleaned with present day wiper blade assemblies and wiper motors.

With reference to Figs. 2 and 3, the means for limiting the tilting of the wiping element, and preventing undesirable crowding thereof, comprises a roller 90 which is rotatably supported on a pin or shaft 91, the ends of which are carried by a bifurcated end portion of a bracket 92, which is attached to and carried by the secondary yoke 40. It should be noted that the roller 90 does not ordinarily engage the surface of the windshield when the blade traverses substantially planar portions thereof, but is arranged to engage the windshield when the wiper blade assembly traverses sharply curved surfaces.

The wiping action of the present day wiper blade assemblies with the improved means of this invention is depicted in Fig. 5, from which it may be seen that when the roller 90 engages the surface 70, tilting of the wiping portion 62 of the element 60 is automatically limited to substantially 10°. In this manner, the roller 90 prevents crowding of the wiping element against the windshield, as depicted by the blade 80 in phantom lines, and thereby permits the use of present day wiper assemblies for cleaning sharply curved surfaces. Moreover, it is to be understood that while only one roller has been shown in the drawing, it may be desirable to use a plurality of rollers, which can be located on opposite sides of the blade, or even at opposite ends and sides of the blade. Moreover, although only one type of conventional blade has been disclosed and described, it is to be understood that the roller means of this invention can be employed to achieve superior wiping action with any type of blade assembly now being used.

While the embodiment of the present invention as herein disclosed, constitutes a preferred form, it is to be understood that other forms might be adopted.

What is claimed is as follows:

1. A wiper assembly for cleaning a surface having substantially planar portions and sharply curved portions comprising, a resilient, elastomeric wiping element conformable to the surface to be wiped, a flexible backing strip for supporting said wiping element, and roller means operatively connected with said wiper at the outer end thereof and engageable only with the sharply curved portions of the surface to be wiped for limiting tilting of said wiping element relative to said backing strip.

2. A wiper assembly for cleaning a surface having substantially planar portions and sharply curved portions including, a resilient, elastomeric wiping element conformable to the surface to be wiped, a flexible backing strip for supporting said wiping element, and roller means carried by said wiper at only one end thereof and engageable only with the sharply curved portions of said surface for preventing crowding of said wiping element against said sharply curved surface portions.

3. A wiper assembly for cleaning a surface having substantially planar portions and sharply curved portions including, a resilient wiping element readily conformable to the surface to be wiped, a flexible backing strip operatively connected with and supporting said wiping element, said wiping element being freely tiltable relative to said strip, means operatively connected with said backing strip for distributing wiping pressure thereto, and roller means carried by said pressure distributing means at the outer end thereof and engageable only with said sharply curved surface portions for preventing crowding of said wiping element against said sharply curved surface portions.

4. A wiper assembly for cleaning a surface having substantially planar portions and sharply curved portions, comprising, a resilient, elastomeric wiping element readily conformable to the surface to be cleaned, a flexible backing strip operatively connected with and supporting said wiping element, said wiping element being freely tiltable relative to said strip, means operatively connected with said backing strip for distributing an arm applied pressure thereto, and roller means carried by said pressure applying means at the outer end thereof and engageable only with said sharply curved surface portions for preventing crowding of said wiping element thereagainst.

5. In a wiper for cleaning a surface having a flexible wiping element readily conformable to the surface to be cleaned, said surface having substantially planar portions and sharply curved portions, a primary yoke having an arm attaching part, and secondary yokes each connected intermediate its ends to the end of the primary yoke and having its opposite ends flexibly connected to the wiping element, said wiping element including a flexible backing strip to which the opposite ends of the secondary yokes are connected; the improvement which comprises, at least one roller carried by one of said secondary yokes adjacent the outer end of said wiper, said roller being engageable only with said sharply curved surface portions for limiting tilting of said wiping element relative to said backing strip.

6. In a wiper for cleaning a surface having a flexible wiping element readily conformable to the surface to be cleaned, said surface having substantially planar portions and sharply curved portions, a primary yoke having an arm attaching part, and secondary yokes each connected intermediate its ends to the opposite ends of the primary yoke and having its opposite ends flexibly connected to the wiping element, said wiping element including a flexible backing strip to which the opposite ends of the secondary yokes are connected; the improvement which comprises, means for preventing crowding of said wiping element against the sharply curved portions of the surface to be cleaned including, a bracket attached to one of said secondary yokes, said bracket carrying a longitudinally extending shaft, and a roller journaled on said shaft and engageable only with the sharply curved portions of said surface for preventing crowding of said wiping element thereagainst.

References Cited in the file of this patent

UNITED STATES PATENTS

| | | |
|---|---|---|
| 2,086,453 | Ward | July 6, 1937 |
| 2,094,206 | Dudley | Sept. 28, 1937 |

FOREIGN PATENTS

| | | |
|---|---|---|
| 457,809 | Great Britain | Dec. 7, 1936 |
| 487,846 | Canada | Nov. 4, 1952 |
| 1,059,913 | France | Nov. 18, 1953 |